United States Patent
Ohmura et al.

[11] Patent Number: 6,136,107
[45] Date of Patent: Oct. 24, 2000

[54] SURFACE TREATED STEEL SHEET FOR BATTERY CONTAINERS, A BATTERY CONTAINER, AND A BATTERY PRODUCED THEREOF

[75] Inventors: Hitoshi Ohmura; Hirokazu Moriyama; Tatsuo Tomomori; Satoshi Iketaka, all of Yamaguchi, Japan

[73] Assignee: Toyo Kohan Co., Ltd., Tokyo, Japan

[21] Appl. No.: 09/040,447

[22] Filed: Mar. 18, 1998

Related U.S. Application Data

[62] Division of application No. 08/633,715, filed as application No. PCT/JP94/01656, Oct. 3, 1994, Pat. No. 5,993,994.

[30] Foreign Application Priority Data

Oct. 22, 1993 [JP] Japan .................................. 5-287787

[51] Int. Cl.[7] .............................. C21D 1/09; C23C 14/34; B05D 3/02; C25D 5/50
[52] U.S. Cl. ...................... 148/537; 148/518; 427/383.7; 205/224; 205/227
[58] Field of Search ..................... 148/518, 537; 427/383.7; 205/176, 181, 184, 191, 224, 227

[56] References Cited

U.S. PATENT DOCUMENTS

| | | | |
|---|---|---|---|
| 2,669,597 | 2/1954 | Ruben | 136/100 |
| 3,206,580 | 9/1965 | Kamm et al. | 200/144 |
| 4,413,039 | 11/1983 | Higuchi et al. | 428/643 |
| 4,731,301 | 3/1988 | Higuchi et al. | 428/648 |
| 4,865,927 | 9/1989 | Laig-Horstebrock et al. | 429/50 |
| 5,527,641 | 6/1996 | Koshiishi et al. | 429/163 |
| 5,576,113 | 11/1996 | Hirofumi et al. | 428/679 |
| 5,587,248 | 12/1996 | Ohmura et al. | 428/610 |

FOREIGN PATENT DOCUMENTS 61-006293  1/1986  Japan .

*Primary Examiner*—Eana Wong
*Attorney, Agent, or Firm*—Browdy and Neimark

[57] ABSTRACT

A steel sheet for a battery container is covered with nickel-tin alloy layer on one side to be the inner side of the battery container which is formed by drawing the steel sheet. A battery using the steel sheet is manufactured by firstly filling positive electrode mix consisting of manganese oxide, graphite and potassium hydroxide and secondly filling negative electrode active material consisting of zinc and potassium hydroxide in the battery container.

6 Claims, 3 Drawing Sheets

SURFACE TREATED STEEL SHEET FOR BATTERY CONTAINERS, A BATTERY CONTAINER, AND A BATTERY PRODUCED THEREOF

CROSS-REFERENCE TO RELATED APPLICATION

The present application is a division of copending parent application Ser. No. 08/633,715, filed Jun. 26, 1999, now U.S. Pat. No. 5,993,994 which is a 371 of PCT/JP94/01656, filed Oct. 3, 1994.

FIELD OF THE INVENTION

The present invention relates to a surface treated steel sheet for battery containers, a battery container and a battery using the battery container. It especially relates to a surface treated steel sheet for battery containers for an alkali manganese battery, a battery container using the surface treated steel sheet and a battery using the battery container.

THE BACKGROUND ART

So far, the post-plating method wherein a drawn container produced from cold rolled steel strip is plated in barrel plating or pre-plating method where a nickel plated steel strip is drawn into a battery container have been employed for battery containers used for primary batteries such as alkali manganese batteries, secondary batteries such as nickel cadmium batteries, and a nickel-hydrogen battery that is expected to be increasingly in demand as a new secondary battery, in which a strong basic solution is packed. The reasons why nickel plating is employed for battery containers such as those of alkali manganese battery or nickel cadmium battery are as follows:

1) a strong basic solution of potassium hydroxide is used as an electrolyte in these batteries, and nickel has excellent corrosion resistance to alkaline solutions.
2) nickel has stable contact resistance when a battery is connected to an external terminal.
3) spot welding is practiced when component parts are welded and assembled into batteries in the battery manufacturing process or when batteries are serially connected in order to increase voltage or when they are connected in parallel in order to allow large current flow, and nickel has also excellent weldability.

However, barrel plating causes unstable quality due to insufficient plating thickness and the difficulty of uniform deposition caused by insufficient circulation of plating solution deep into the bottom portion of the battery container when the inside of a tall cylindrical battery container is plated by barrel plating. On the other hand, although the above-mentioned problems are not caused in the pre-plating method, the battery container produced from a nickel-plated steel sheet that is treated by thermal diffusion has improved corrosion resistance because the nickel plating layer is recrystallized and softened and thus has good extensibility, but it has poor adhesion to the positive electrode mix because the inner surface of the positive electrode container (the battery container of the present invention) has small cracks and a smooth surface after drawing.

Thereupon, battery performance has a close relationship to the properties of the inner surface of the positive electrode container (the battery container of the present invention) in alkali manganese battery (see FIG. 2). The better the adhesion of the positive electrode mix (composed of manganese dioxide as the positive electrode active material, graphite as the conducting material and potassium hydroxide as the electrolyte) of the alkali manganese battery to the inner surface of the battery container, the better the battery performance. In the case of alkali manganese battery, the positive electrode mix contacts with the battery container and the battery container functions not only as a container but also as an electrical conductor that transmits electrons. Therefore, when the contact resistance between the positive electrode mix and the inner surface of the battery container is large, the internal resistance of the battery is likewise large, and battery performance is deteriorated by the resultant drop of current or reduction of discharge duration. Therefore, it is preferable to reduce the contact resistance between the positive electrode mix and the inner surface of the battery container as little as possible in order to obtain a high performance battery.

Alkali manganese battery is superior to manganese battery in performancing high load electrical discharge where there is an especially large current flow, and the battery performance of the alkali manganese battery can be improved by reducing internal resistance of the battery. For the purpose of reducing the contact resistance between the positive electrode mix and the battery container to enable a large current flow, several methods such as roughening the inner surface of the battery container, providing grooves on the inner surface of the battery container in the lengthwise direction, and coating a conductive material composed of graphite added by binder on the inner surface of the battery container etc., are proposed. (See Battery Handbook, page 84, issued by MARUZEN in 1990)

Improvement in the contact between the positive electrode mix and the battery container causes a reduction of internal resistance, and consequently larger battery capacity can be obtained by reducing the amount of graphite in the positive electrode mix and increasing the amount of manganese dioxide as the positive electrode active material. Thus, battery performance depends considerably on the improvement of the internal resistance and particularly, the contact between the battery container and the positive electrode mix.

However, the use of a roughened punch in order to roughen the inner surface of the battery container causes the problem where the rougher the punch, the lower the drawability, and the punch can not be roughened beyond a certain extent.

Also, the use of a steel substrate having larger crystal grains to roughen the inner surface of the battery container after drawing causes the problem that the larger crystal grains result in a roughened surface at the positive electrode terminal and a deteriorated appearance for the battery container product in the case of a pip type battery that is recently dominant (the part of the positive electrode terminal of the battery container is convexly shaped).

Further, although a conductive paint coating or conductive material coating on the inner surface of the battery container can reduce internal resistance, it also causes disadvantages such as an increase in the process of the battery manufacturing and an increase in production cost.

Therefore, a battery material having a low cost of manufacture and low internal resistance is required for high performance alkali manganese batteries.

INDICATION OF THE INVENTION

The surface treated steel sheet for a battery container of the present invention has one of the following structures:
1) nickel-tin alloy layer is formed as the uppermost layer on the surface that is to become the inner surface of a battery container 2) nickel-tin alloy layer as the uppermost layer and nickel layer as the lower layer are formed on the surface that is to become the inner surface of a battery container
3) nickel-tin alloy layer as the uppermost layer, nickel layer as the intermediate layer and nickel-iron alloy layer as the lowermost layer are formed on the surface that is to become the inner surface of a battery container
4) nickel-tin alloy layer as the uppermost layer and nickel-iron alloy layer as the lower layer are formed on the surface that is to become the inner surface of a battery container
5) nickel-tin alloy layer as the uppermost layer, iron-nickel-tin alloy layer as the intermediate layer and nickel-iron alloy layer as the lowermost layer are formed on the surface that is to become the inner surface of a battery container
6) nickel-tin alloy layer as the uppermost layer, nickel layer as the intermediate layer and nickel-iron alloy layer as the lowermost layer are formed on the surface that is to become the outer surface of a battery container
7) nickel-tin alloy layer as the uppermost layer and nickel layer as the lower layer are formed on the surface that is to become the outer surface of a battery container
8) nickel layer is formed as the uppermost layer on the surface that is to become the outer surface of a battery container The battery containers of the present invention are produced by drawing any surface treated steel sheet mentioned above in 1) to 8).

The batteries of the present invention are produced using the above-mentioned battery containers, and the positive electrode mix (manganese dioxide+graphite as conductive material+potassium hydroxide solution as electrolyte) is packed on the positive electrode side and the negative electrode gel (granular zinc+potassium hydroxide solution as electrolyte) is packed on the negative electrode side in the battery container.

Batteries having the structures mentioned above can have excellent battery performance such as a low internal resistance in the battery, a large short-circuit current and long discharge duration.

THE BEST CONDITION FOR PRACTICING THE INVENTION

Figure 1:
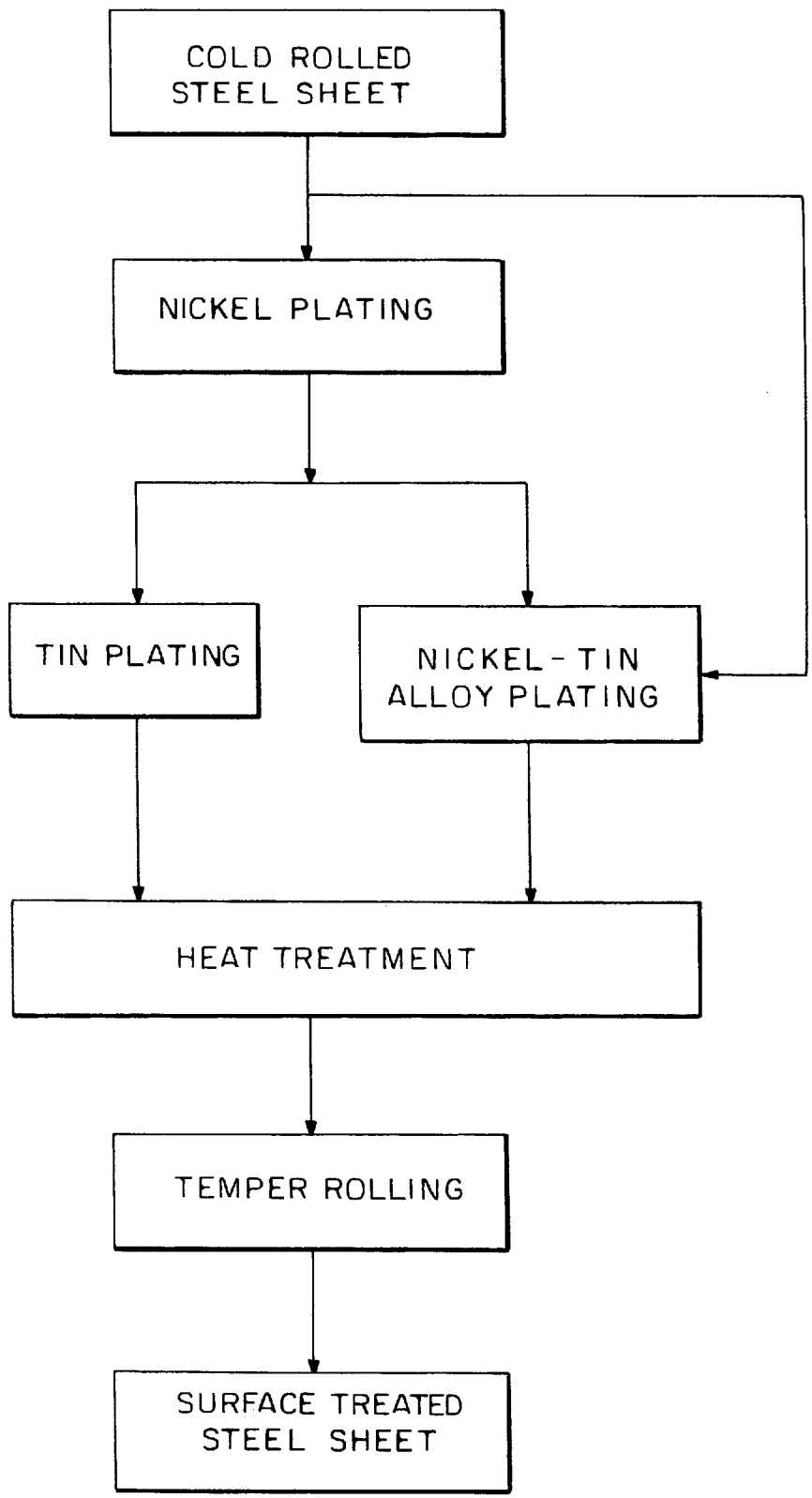
FIG. 1 shows a process flow diagram of a manufacturing process for a surface treated steel sheet of the present invention.
Figure 2:
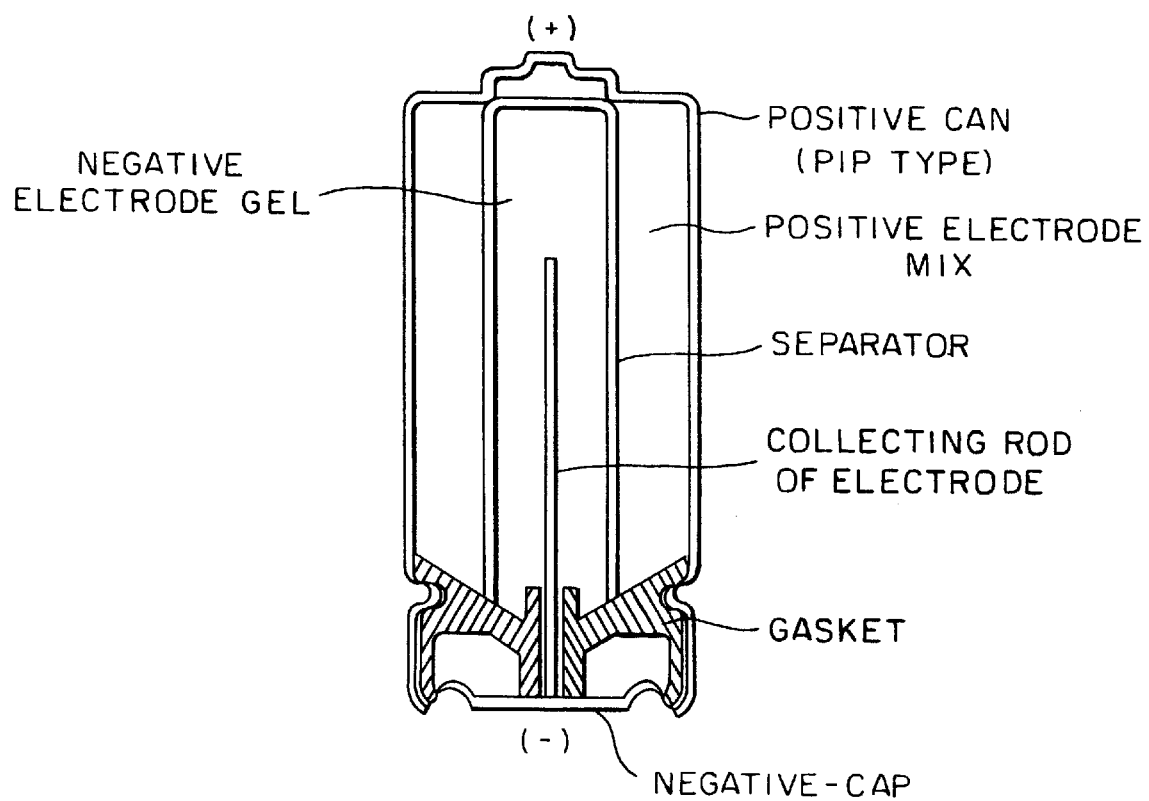
FIG. 2 shows a cross sectional view of a battery of the present invention.

The present invention is described below in detail.

First of all, the surface treated steel sheet of the present invention is explained.

The surface treated layer of the steel sheet of the present invention has a different structure of surface the treated layer on either side that is to become the inner surface of the battery container or the side that is to become the outer surface of a battery container as mentioned previously.

At first, the structure of the surface treated layer on the side that is to become the inner surface of a battery container. On the side that is to become the inner surface, nickel-tin alloy layer or iron-nickel-tin alloy layer is formed. The reason why these alloy layers are formed on the inner surface of a battery container is to cause numerous micro cracks in these layers when the surface treated steel sheet is drawn into a battery container. And another reason why these alloy layers are formed on the inner surface of a battery container is because when the steel substrate comprising a battery container is exposed on the surface of the battery container, the positive electrode mix will react with the iron present and form iron oxide, which serves to increase the internal resistance of the battery and cause a deterioration of the battery performance in the case of alkali manganese batteries.

The thickness of the above-mentioned nickel-tin alloy layer or iron-nickel-tin layer is preferably in the range of 0.15 to 3.0 $\mu$m, more preferably 0.2 to 2.0 $\mu$m. When the thickness of the alloy layer is less than 0.15 $\mu$m, smaller cracks are formed in the alloy layer in the drawing process, and the adhesion of the surface treated layer to the positive electrode mix is not improving, and consequently the internal resistance of the battery is not reduced. On the other hand, when the thickness of the alloy layer is more than 3.0 $\mu$m, the effect of the improving adhesion of the surface treated layer to the positive electrode mix becomes saturated and cost effectiveness is lost.

The nickel-tin alloy layer can be formed either by nickel-tin alloy plating or by a process comprising a prior nickel plating and prior tin plating followed by heat treatment, which causes diffusion of tin into nickel, and the resulting formation of nickel-tin alloy layer.

In addition, it is preferable that the nickel layer and/or iron-nickel alloy layer is formed under the nickel-tin alloy layer for the purpose of improving the adhesion of the nickel-tin alloy layer to the steel substrate as well as improving the corrosion resistance of the entire surface treated steel sheet. Although the thickness of these layers are not particularly defined, a thickness less than 3 $\mu$m is preferable based on economic considerations.

Secondly, the structure of the surface treated layer on the side that is to become the outer surface of a battery container is explained. The reason why nickel layer is formed on the outer surface of a battery container is as follows:

As the outer surface of a battery container is to be junction which is connected with an external terminal, a small and stable contact resistance and excellent corrosion resistance are required for essential performance of the outer surface of the battery container.

Next, the manufacturing process for the surface treated steel sheet is described based on FIG. 1.

[Steel Sheet]

Aluminum killed steel is generally preferred as the substrate for plating. Non-aging hyper low carbon steel with added niobium, boron or titanium can be available. Usually, a steel strip that is electrolytically cleaned, annealed and skin-passed after being cold rolled is used as the substrate for plating.

[Nickel Plating]

After pre-treatment consisting of electrolytic cleaning in alkali solution, rinsing in water, pickling in sulfuric acid or hydrochloric acid (electrolytic or dipping) and rinsing in water, the above-mentioned steel substrate for plating is plated with nickel. Any known nickel plating bath such as Watt bath, sulfamic acid bath or chloride bath can be used. Also, any type of nickel plating such as mat plating, semi-gloss plating or gloss plating can be formed. Improvement in battery performance can be particularly expected using the gloss plating of these platings. The gloss plating process uses the plating bath comprising a nickel plating solution with an added organic compound containing sulfur (benzene-sulfonic acid derivatives such as sodium benzenesulfonate or paratoluonesulfonamide, or saccharin), which gives luster to the plating by depositing finely plated crystals and by leveling the plating layer. And the gloss plating also causes an extremely hard plating layer.

The gloss plating process mentioned hereupon can be any one of the following processes:

1) the one wherein a glossy nickel plating layer is directly formed on the steel substrate by gloss plating;
2) the one wherein a mat finished nickel plating layer is formed on the steel substrate by mat plating followed by plating a glossy nickel plating layer on top;
3) the one wherein a semi-glossy finished nickel plating layer is formed on the steel substrate by semi-gloss plating followed by plating a glossy nickel plating layer on top.

Tin plating on the glossy nickel plating layer plated on the steel substrate followed by heat treatment is preferable because scaly cracks are also formed in the glossy nickel plating layer when the plated steel substrate is drawn, and then numerous cracks are formed in the entire plating layer accompanied by micro cracks formed in the tin nickel plating layer, namely, the crack density increases.

In the present invention, a steel sheet is plated with nickel either on both sides or only one side by a nickel plating selected from methods 1) to 3) mentioned above.

The thickness of the nickel plating layer plated on a surface that is to become the outer side of the battery container is in the range of 0.5 to 5 $\mu$m, preferably 1 to 4 $\mu$m. In the case where nickel is plated on only one side of a steel sheet, it is plated on the surface that is to become the outer side of the battery container.

The thickness of the nickel plating layer plated on a surface that is to become the inner side of the battery container is preferably in the range of 0.5 to 4 $\mu$m, more preferably 1 to 3 $\mu$m from the view point of harmony between battery performance and cost efficiency. When the above-mentioned thickness of the nickel plating is less than 0.5 $\mu$m on the inner surface of the battery container, numerous pinholes are formed in the nickel plating layer, which undesirably cause the increased dissolution of iron (steel sheet) into the alkali solution, that is the electrolyte solution within the battery, and the increased formation of iron oxide.

The thickness of nickel plating less than 0.5 $\mu$m on the outer surface of the battery container is also undesirable because corrosion resistance is apt to be deteriorated.

[Tin Plating]

The above-mentioned nickel plated steel sheet is followed by in plating that is formed on both sides or the one side that is to become the inner side of the battery container.

While either of the usual acid bath or the usual alkaline bath available, stannous sulfate bath or phenolsulfonic acid bath is preferably used in the present invention. When the tin plating layer is to be formed, the amount of tin plating is defined from the following view point. In the present invention, the entire tin plating layer should be converted into a nickel-tin alloy layer by a heat treatment which is used to form the nickel-tin alloy layer, for the reason that when the tin plating layer remains in the nickel-tin alloy layer after heat treatment, tin dissolves into the potassium hydroxide solution that is the electrolyte of the alkali battery and hydrogen is generated, which deteriorates battery performance. Therefore, it is essential that the entire tin plating layer is converted into nickel-tin alloy by heat treatment.

When the plated steel sheet is heated below 700° C. in the heat treatment process, the resultant nickel-tin alloy is mainly composed of $Ni_3Sn$, $Ni_3Sn_2$ and $Ni_3Sn_4$. As $Ni_3Sn$ has the least amount of tin relative to nickel among these alloy composition, tin is completely alloyed with nickel by heat treatment when tin, which is present in an amount less than that found in $Ni_3Sn$ (atomic weight ratio of Ni:Sn is 3:1), is plated on a nickel plating, which the amount of Ni present in an amount is more than that found in the $Ni_3Sn$ layer. Accordingly, the amount of tin should be less than 3 times the amount of nickel by the atomic weight ratio of tin to nickel.

As the atomic weight of tin is 118.6 and that of nickel is 58.7, the atomic weight ratio of Ni:Sn is 3:1, so the ratio of amount of tin/amount or nickel is about 0.67 as shown in the following equation.

$$\text{The ratio of amount of tin/amount of nickel} = 118.6 \, (58.7 \times 3) = 0.67$$

When tin plating layer is formed at a larger ratio than that mentioned-above (about 0.67), the nickel required for the formation of the nickel-tin alloy layer is insufficient at the time of alloying treatment (heat treatment), and the tin plating layer remains as metallic tin as plated, which is not preferable for the present invention.

In other words, when nickel is present in an amount that is about 1.48 (=1/0.67; inverse of above-mentioned value 0.67) times the amount of tin that is plated, tin is totally alloyed into nickel-tin alloy during the heat treatment process, and tin does not remain as metallic tin, which is preferable for battery performance.

[Nickel-Tin Alloy Plating Another Method by which A Nickel-Tin Alloy Layer is formed]

The above-mentioned method is one of the methods by which a nickel-tin alloy layer is formed, wherein after a tin plating layer is formed on a nickel-plated steel sheet, the plated steel sheet is heat treated to form a nickel-tin alloy layer. In the present invention, another method, wherein a nickel-tin alloy layer is directly formed on a steel sheet, is proposed. The use of this method followed by heat treatment improves short circuit current in battery performance.

The steel sheet used as the substrate for the above-mentioned nickel-tin plating can suitably be selected from the following two kinds of steel sheets.

1) cold rolled steel sheet
2) steel sheet previously plated with nickel

As mentioned above, two types of method for forming a nickel-tin alloy layer are proposed, and heat treatment is used after plating by either the first method or the second one because a nickel plating layer formed on the surface that is to become the outer side of the battery container can be recrystallized and softened by heat treatment (which is helpful for improving corrosion resistance of the battery container).

The second mentioned method of nickel-tin alloy plating (another method for the forming nickel-tin alloy layer) is described below in detail.

Chloride-fluoride bath or pyrophosphoric acid bath is employed as a bath for nickel-tin alloy plating. The nickel-tin alloy layer can be formed on one side of a cold rolled steel sheet as well as on both sides of it. The thickness of the nickel-tin alloy plating layer formed on one side of the steel sheet is different from that formed on the other side of the steel sheet.

While a thickness range of 0.15 to 3.0 $\mu$m is preferable on the surface that is to become the inner side of the battery container, a thickness in the range of 0.15 to 1.5 $\mu$m is preferable on the surface that is to become the outer side of the battery container from the view point of corrosion resistance and contact electrical resistance.

[Heat Treatment]

In the first mentioned method for forming a nickel-tin alloy layer, nickel is plated on both sides of a steel sheet followed by plating with tin on at least one side of the nickel plated steel sheet and then heat treating to form nickel-tin alloy. Alternatively, nickel is plated on both sides of a steel sheet followed by heat treatment and then tin plating on at least one side of the nickel plated steel sheet followed by heat treatment to form a nickel-tin alloy. Furthermore, nickel can be plated on a steel sheet or on a nickel plated steel sheet followed by plating with nickel-tin alloy (the second method) and then heat treatment.

The heat treatment is preferably carried out under a non-oxidizing or reducing gas atmosphere in order to prevent the formation of an oxide film on the plated steel sheet. Heat treatment at about 200° C. produces a nickel-tin alloy layer. When attempting to improve the corrosion resistance of the plating layer, particularly on the outer side of the battery container, by forming a nickel-iron diffusion layer between the nickel plating layer and the iron substrate (steel plate) accompanying the alloying treatment of nickel-tin alloy, heating at 450° C. or more is required for the formation of a diffusion layer. More specifically, heat treatment is practiced in the temperature range of 450 to 850° C. for a period ranging between 30 seconds to 15 hours.

Either the box annealing process or the continuous annealing process can be used as the heat treatment process, and the preferred conditions for heat treatment is at a temperature between 600 to 350° C. for 30 seconds to 5 minutes in the continuous annealing, and at a temperature between 450 to 650° C. for 5 to 15 hours in the box annealing. In addition, an iron-nickel-tin alloy layer (3 component elements) can be formed between the steel substrate and the plating layers of nickel and tin in the present invention. For this case, after plating nickel on the steel substrate followed by tin plating on the nickel plated steel substrate, heat treatment at rather high temperature for a longer period of time causes the mutual diffusion of the 3 component elements.

[Skin Pass]

Skin pass is carried out for the purpose of preventing origination of stretcher strains caused by heat treatment after nickel plating. Skin pass is carried out for the other purpose of obtaining a steel sheet having a desired surface roughness or appearance such as bright finish or dull finish by using working rollers having different surface roughness in the skin pass process.

The present invention is described in more detail in the following examples.

MANUFACTURING OF SURFACE TREATED STEEL SHEET

Example 1

A cold rolled and annealed aluminum killed low carbon steel sheet having a thickness of 0.25 mm was used as a substrate for plating.

The chemical composition of the presented steel sheet is as weight % as follows:
C:0.04%, Mn:0.19%. Si:0.01%, P:0.012%, S:0.009%, Al:0.064%, N:0.0028%
The steel sheet mentioned above was electrolytically degreased under the conditions described below.
(Electrolytical decreasing in alkali solution)

Electrolysis Conditions;
Bath composition: Sodium hydroxide 30 g/l
Current density and treatment time :
5 A/dm$^2$ (anodic treatment)×10 seconds and
5 A/dm$^2$ (cathodic treatment)×10 seconds
Bath temperature: 70° C.

After this treatment, the steel sheet was pickled in sulfuric acid (dipping in 50 g/l of sulfuric acid at 30° C. for 20 seconds), and then plated with nickel under the conditions described below.

Bath composition Nickel sulfate 320 g/l
Boric acid 30 g/l
Sodium lauryl sulfate 0.5 g/l
Bath temperature: 55±2° C.
pH: 4.1~4.6
Stirring: Air bubbling
Current density: 10 A/dm$^2$
Anode: nickel pellet (nickel pellets were packed in a titanium basket and the basket was covered with a polypropylene bag.)

The steel sheet was mat nickel plated on one side or both sides, and the thickness of the plating layer was controlled by varying the duration of electrolysis under the above-mentioned conditions.

After nickel plating, the plated steel sheet was tin plated on one side or both sides of the plated steel sheet in a stannous sulfate bath under the conditions described below.
(Tin plating)

Bath composition Stannous sulfate 30 g/l
Phenolsulfonic acid 60 g/l
Ethoxylated α-naphthol 5 g/l
Bath temperature: 55±2° C.
Current density: 10 A/dm$^2$
Anode: Plate of tin Several types of samples having various plating thickness were manufactured by varying the duration of electrolysis under the above-mentioned conditions.

Next, after nickel and tin plating, the plated steel sheet was heat treated to form a nickel-tin alloy layer under the conditions described below. The atmosphere for heat treatment was as follows Protective gas composed of 6.5% hydrogen and residual nitrogen and having a dew point of −55° C. was used.

Several types of surface treated steel sheets were manufactured by varying the soaking temperature and the soaking period. Those manufactured samples are shown as Sample 1 to 10 in Table 1. The thickness of the nickel plating layer, the nickel-iron alloy layer and the nickel-tin alloy layer shown in Table 1 were measured by GDS (Glow discharge emission spectral analysis).

The surface analysis by x-ray diffraction analysis and GDS (Glow discharge emission spectral analysis) of sample in which a nickel plating layer was covered with tin and then heat treated showed the formation of nickel-tin alloy. The sample was manufactured as follows: a steel sheet was plated with nickel to a thickness of 2 μm, and then plated with tin to a thickness of 0.75 μm, and afterwards the plated steel sheet was heat treated at 500° C. for 6 hours.

It was found by X-ray diffraction analysis that the nickel-tin alloy layer produced from a two layered plating comprising nickel layer and tin layer and was mainly composed of $Ni_3Sn$. The hardening of the plating surface is supposed to be dependent on the precipitation of these inter metallic compounds. It was found that heat treatment at 300° C. for 6 hours mainly produced $Ni_3Sn_2$ and that while heat treatment at higher temperatures produced an alloy layer richer in nickel content, heat treatment at lower temperatures produced an alloy layer richer in tin content. Furthermore, it was confirmed by GDS (Glow discharge emission spectral analysis) that heat treatment at 200° C. for 1 hour also produced a nickel-tin alloy layer.

Example 2

A surface treated steel sheet was manufactured using the same steel substrate as in Example 1 by the following manufacturing process wherein the steel sheet was plated with semi-glossy nickel, then plated with glossy nickel and finally plated with tin under the same tin plating conditions as in Example 1 followed by heat treatment and skin pass.

The surface treated steel sheet was manufactured by a series of processes consisting of semi-glossy nickel plating on both sides of the steel sheet and subsequent glossy nickel plating on both sides of the steel sheet under the following conditions after electrolytical degreasing in alkali solution and pickling in sulfuric acid under the same conditions as described in Example 1.

1) Semi-glossy nickel plating

Bath composition : Nickel sulfate 300 g/l
  Boric acid 30 g/l
  Nickel chloride 45 g/l
  Sodium lauryl sulfate 0.5 g/l
  Brightener on the market 1.5 ml/l
  (unsaturated alcohol and unsaturated carboxlic acid based)

Bath temperature: 55±2° C.

pH: 4.0 to 4.5

Stirring: Air bubbling

Current density: 15 A/dm$^2$

2) Glossy nickel plating

Glossy nickel plating was practiced under the following conditions after semi-glossy nickel plating shown in 1).

Bath composition: Nickel sulfate 300 g/l
  Boric acid 30 g/l
  Nickel chloride 45 g/l
  Sodium lauryl sulfate 0.5 g/l
  Brightener on the market 1.0 ml/l
  (Benzene sulfonic acid derivative)

Bath temperature: 60±2° C.

pH: 4.3 to 4.6

Stirring: Air bubbling

Current density: 10 A/dm$^2$

Under the above-mentioned conditions, one side of the steel sheet was only plated with semi-glossy nickel and the other side of the steel sheet was plated with semi-glossy nickel and further plated with glossy nickel on top.

Several types of samples having various nickel a plating thicknesses by varying the electrolysis treatment time. The thus manufactured samples are shown as samples 11 to 14 in Table 2.

Example 3

The steel substrate of Example 1 was mat nickel plated under the same conditions as Example 1 and subsequently plated with nickel-tin alloy using a chloride- fluoride bath. The conditions for nickel-tin alloy plating are as follows:

Bath composition: Stannous chloride 50 g/l
  Nickel chloride 300 g/l
  Sodium fluoride 30 g/l
  Acid ammonium fluoride 35 g/l Bath temperature: 65° C.

pH: 4.5

Current density: 4 A/dm$^2$

Anode composed of nickel-tin alloy containing 28% tin was used. Several types of samples having various thicknesses of nickel-tin alloy plating was obtained by varying the electrolysis treatment time. The thus manufactured samples are shown as samples 15 to 18 in Table 3.

(Explanation of the battery container)

Next, a method of manufacturing a battery container using the above-mentioned surface treated steel sheets is described below.

The battery container of the present invention is produced from the surface treated steel sheets manufactured as mentioned above by deep drawing. The inventors of the present invention found that the application of the above-mentioned surface treated steel sheets as a battery container of alkali dry battery resulted in superior battery performance compared to using conventional battery containers.

(Inner surface structure of the battery container)

The internal resistance of an alkali manganese battery depends on the contacting state of graphite as the conductive material in a positive electrode mix with the inner surface of the battery container. Namely, it is believed that the formation of uneven micro cracks on the inner surface the battery container provides a wider area for contacting of the positive electrode mix with the inner surface of the battery container, which results in lower contact resistance and stronger adhesion, and consequently reduced internal resistance of the battery.

Figure 3A:
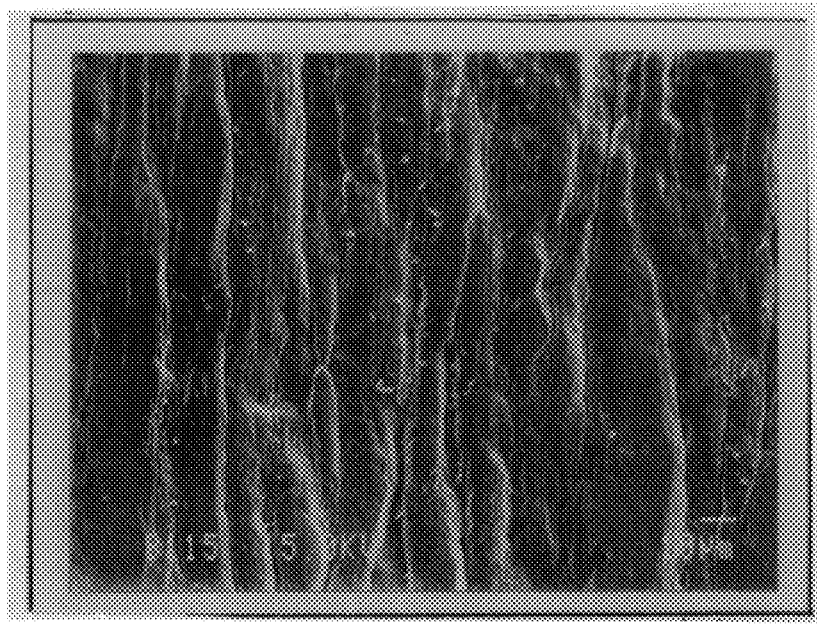
FIGS. 3a and 3b are observation photographs taken of the inside of battery containers.
Figure 3B:
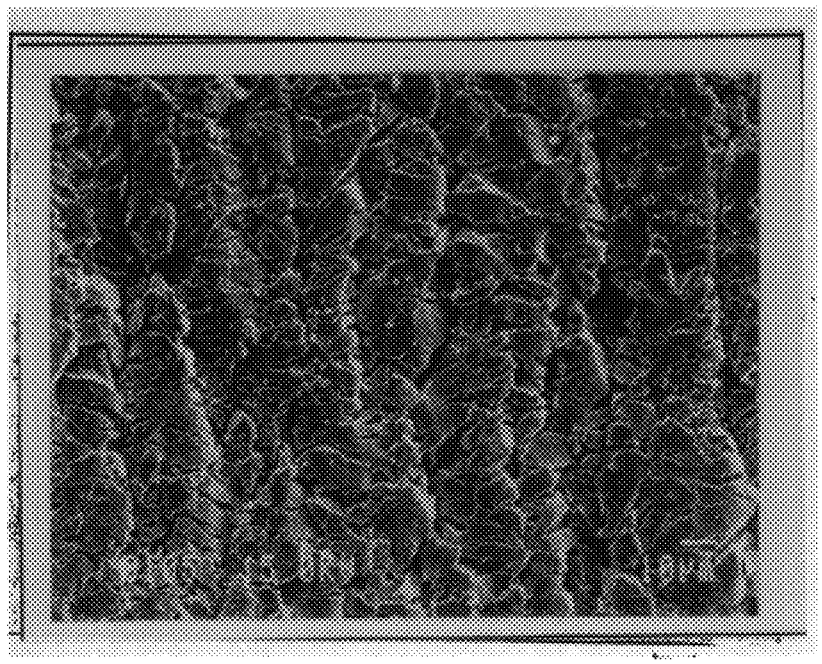

Hereupon, it is believed that the internal resistance is reduced by the remarkable improvement of adhesion of the positive electrode mix to the inner surface of the battery container as the result of the formation of the cracks caused by drawing the surface treated steel sheet having an extremely hard nickel-tin alloy layer. In order to confirm this hypothesis, the inner surfaces of the conventional battery container and that of the present invention were observed under a microscope. The results are shown in FIGS. 3a and 3b. FIG. 3a shows the inner surface of a conventional battery container produced by drawing a conventional nickel plated steel sheet, in which unevenness is observed only in the longitudinal direction of the container. FIG. 3b shows the inner surface of a battery container of the present invention which is produced by drawing the surface treated steel sheet obtained by successively plating 2 μm of nickel and 0.4 μm of tin on a cold rolled steel sheet, and then forming a nickel-tin alloy layer by heat treatment of the plated steel sheet at 500° C. for 6 hours, in which numerous micro cracks having diameters of several μm are observed in the longitudinal direction of the container and in the circumferential direction as well. It is believed that the internal resistance of the battery is reduced by the penetration of the positive electrode mix containing graphite powder into the micro cracks formed on the inner surface of the container in the longitudinal and circumferential directions. It is supposed that the reason why numerous micro cracks are formed on the inner surface of the drawn container is because the nickel-tin alloy layer is hard and brittle. This feature of hardness and brittleness was confirmed by the following experiment.

A cold rolled steel sheet was successively plated with 2 μm of nickel and 1.6 μm of tin, and then heat treated at 500° C. for 6 hours. The hardness of the surface layer was measured to have a value of 860 with a micro Vickers hardness tester (load: 10 g). On the other hand, the surface hardness of a semi-glossy nickel layer having a thickness of 2 μm was measured to have a value of 355 and that of a nickel layer having a thickness of 2 μm followed by the same subsequent heat treatment at 500° C. for 6 hours as described above was measured to have a value of 195.

The results showed that the surface layer consisting of tin layer plated on nickel plating layer followed by heat treatment was remarkably harder than those of 2 former surface layers (the one consisting of semi-glossy nickel plating alone and the one consisting of semi-glossy nickel plating followed by heat treatment).

(Outer surface structure of the battery container)

Although the type of surface treatment layer formed on the outer surface of the battery container is not particularly defined in the present invention, it is preferable to form a nickel plating layer since a small contact resistance, which is invariable over time, is required on the outer surface of the battery container. Furthermore, it is also preferable to form a nickel-tin alloy layer on a nickel plating layer in the present invention. As this alloy layer is extremely hard as mentioned above, scratch resistance is improved, and this can cover up a fault that the nickel plating layer is apt to be scratched by the drawing process or the battery manufacturing process as a result of softening of the nickel plating layer especially when it is heat treated to improve corrosion resistance after plating. A lower contact resistance is required on the outer surface of the battery container, and it can be attained by plating nickel-tin alloy on the surface that is to become the outer surface of the battery container. In the case where a steel sheet is plated with 2 $\mu$m of nickel followed by plating with 0.75 $\mu$m of tin on top and then heat treatment at 500° C. for 6 hours, the contact resistance measured 1.8 m $\Omega$ by 4 probe method. On the other hand, the contact resistance of the steel sheet plated with 2 $\mu$m of nickel alone measured 3.5 m $\Omega$. Therefore, it can be seen that a nickel-tin layer is the surface treated layer having a lower contact resistance.

The preferable thickness of the nickel plating layer formed on the outer surface of the battery container is in the range of 0.5 to 5 $\mu$m, more preferably in the range of 1 to 4 $\mu$m. It is preferable that this nickel plating layer is converted into a diffused nickel-tin alloy layer by heat treatment in order to improve corrosion resistance. when the nickel-tin alloy layer is formed on the inner surface of the battery container, the thickness of this alloy layer is preferably in the range of 0.15 to 3 $\mu$m, more preferably in the range of 0.2 to 2 $\mu$m. Furthermore, when the nickel-tin alloy layer is formed on the outer surface of the battery container, the thickness of this alloy layer is preferably in the range of 0.15 to 1.5 $\mu$m.

(Explanation of manufacturing of the battery container)

Battery containers for Tan-3 type (JIS LR-6) alkali manganese battery were manufactured from the above-mentioned surface treated steel sheet by drawing.

At first, a circular blank was punched out from the above-mentioned surface treated steel sheet, and then it was drawn. After that the upper open edge portion of the battery container was trimmed off, and a cylindrical container having 49.3 mm in longitudinal length and 13.8 mm in outer diameter was manufactured under an 8 stage drawing process.

(Battery manufacturing)

After manufacturing a battery container in the above-mentioned manner, a Tan-3 type (JIS LR-6) alkali manganese battery was manufactured as follows:

At first, manganese dioxide and graphite were gathered together at a weight ratio of 10:1, then they were added with potassium hydroxide (8 mole) and all of them were mixed, and then the positive electrode mix was prepared. Afterwards the positive electrode mix was pressed in a metal mold, then shaped in the positive electrode mix pellet having a doughnut shape and the prescribed dimensions, and then the thus produced pellets were compressively inserted into the battery container. Subsequently, the prescribed portion below the open edge of the battery container was necked-in processed in order to install a negative electrode plate made by spotwelding some negative electrode collecting rods into the battery container. Afterwards, a separator produced from a non-woven fabric made of VINYLON was inserted into the battery container along the inner circumference of the inserted pellets that had been compressively attached to the inner surface of the battery container, and then negative electrode gel composed of granular zinc and potassium hydroxide saturated with zinc oxide was inserted into the battery container. Finally, after the negative electrode plate installed with a gasket made of insulating material was inserted into the battery container, it was seamed with the battery container by caulking, to complete an alkali manganese battery.

In the case where graphite was coated on the inner surface of the battery container, 80 parts by weight of graphite and 20 parts by weight of thermosetting epoxy resin were first dispersed in methyl ethylketone, then spray coated onto the inner surface of the battery container followed by drying at 150° C. for 15 minutes.

The battery performance of a Tan-3 type alkali manganese battery manufactured in the above-mentioned manner was measured after being kept at room temperature for 24 hours. Furthermore, in order to monitor any change in the course of time, the battery performance was also measured after the battery was stored for a month (30 days) in a thermo-hygrostatic room having a temperature of 60° C. and a humidity of 90%. The battery performance was evaluated by measuring two characteristics of which one was the internal resistance (m $\Omega$) by the alternating current impedance method (Frequency 1 kHz) and another was the short-circuit current (A) in which 1 m $\Omega$ was charged. Both measurements were carried out at 20° C. The results are shown in Table 5.

Comparative Example

A steel sheet was nickel plated, successively heat treated under the same conditions as those of Example 1, and made into samples for the comparative example, and the battery performance was evaluated in the same manner as that of Example 1. The results are shown as Samples 19 to 26 in Table 4.

Samples 19 to 21 correspond to Example 1. Samples 19 to 20 of these samples had a higher initial internal resistance than those of the Example 1 in the evaluation of the battery performance, as well as exhibiting 2 to 3A lower short-circuit current than those of Examples of the present invention. Sample 21 in which the inner surface was coated with graphite corresponds to Sample 9 and 10 of Example 1, and exhibited a higher internal resistance and a lower short-circuit current than those of Examples of the present invention.

Samples 22 to 24 correspond to Example 2. Samples 22 to 23 of these samples had a higher internal resistance and a lower short-circuit current than Samples 11 and 13. Sample 24 in which the inner surface was coated with graphite had a higher internal resistance and a lower short-circuit current than corresponding Samples 12 and 14.

Samples 25 to 26 correspond to Example 3. Sample 25 of these samples had a higher internal resistance and a lower short-circuit current than those of Sample 15, and Sample 26 had a higher internal resistance and a lower short-circuit current then those of Sample 16.

POSSIBILITY OF USE IN INDUSTRY

As described above, the surface treated steel sheet of the present invention, in which a nickel-tin alloy layer is formed on the one side of a steel substrate that is to become the inner surface of a battery container, has effects such as a remarkably low internal contact resistance with the positive electrode mix and excellent alkali corrosion resistance when it is used as the material for a battery container.

In addition, the battery container of the present invention manufactured by drawing etc., in which the above-mentioned surface treated steel sheet is adopted for use, has the excellent properties of a low internal resistance and high short-circuit current on the inner surface of the battery container and a low contact resistance on the outer surface of the battery container.

Furthermore, the battery of the present invention, in which the battery container of the present invention is used, has excellent battery performance such as a low internal resistance and high short-circuit current.

TABLE 1

| Sample No. | | Plating layer | thickness of plating Ni μm | thickness of plating Sn μm | condition of the heat treatment after plating heated temp. ° C. | condition of the heat treatment after plating heated time (min.) | thickness of the constructional layer Fe—Ni diffusion layer (μm) | thickness of the constructional layer Ni layer (μm) | thickness of the constructional layer Ni—Sn alloy layer (μm) | thickness of the constructional layer Fe—Ni—Sn alloy layer (μm) |
|---|---|---|---|---|---|---|---|---|---|---|
| EXAMPLE 1 | | | | | | | | | | |
| 1 | inner side | Ni—Sn alloy formation | 1.8 | 0.09 | 500 | 360 | 1.86 | 0.43 | 0.16 | — |
|  | outer side | Ni—Sn alloy formation | 1.9 | 0.10 | | | 1.75 | 0.40 | 0.17 | — |
| 2 | inner side | Ni—Sn alloy formation | 2.0 | 0.15 | 500 | 360 | 2.25 | 0.28 | 0.32 | — |
|  | outer side | Ni—Sn alloy formation | 2.0 | 0.74 | | | 1.96 | 0.15 | 0.60 | — |
| 3 | inner side | Ni—Sn alloy formation | 0.5 | 0.36 | 500 | 360 | 0.53 | — | 0.61 | — |
|  | outer side | Ni—Sn alloy formation | 2.0 | — | | | 1.96 | 0.95 | — | — |
| 4 | inner side | Ni—Sn alloy formation | 1.1 | 0.73 | 500 | 360 | 0.93 | — | 1.09 | 0.1 |
|  | outer side | Ni plating | 1.8 | — | | | 1.9 | 0.8 | — | — |
| 5 | inner side | Ni—Sn alloy formation | 1.9 | 0.74 | 300 | 360 | — | 1.7 | 0.73 | — |
|  | outer side | Ni plating | 2.0 | — | | | — | 1.8 | — | — |
| 6 | inner side | Ni—Sn alloy formation | 1.9 | 0.76 | 600 | 360 | 4.41 | 0.28 | 0.81 | 0.40 |
|  | outer side | Ni—Sn alloy formation | 4.8 | 0.75 | | | 5.40 | 0.15 | 0.60 | — |
| 7 | inner side | Ni—Sn alloy formation | 1.9 | 1.52 | 500 | 360 | 1.25 | — | 0.70 | — |
|  | outer side | Ni plating | 2.0 | — | | | 2.02 | 0.9 | — | — |
| 8 | inner side | Ni—Sn alloy formation | 3.9 | 2.53 | 500 | 360 | 2.35 | — | 2.98 | — |
|  | outer side | Ni—Sn alloy formation | 4.0 | 1.49 | | | 1.03 | 2.83 | 1.80 | — |
| 9 | inner side | Ni—Sn alloy formation | 1.0 | 0.38 | 500 | 360 | 1.34 | — | 0.65 | — |
|  | outer side | Ni plating | 3.0 | — | | | 2.43 | 1.63 | — | — |
| 10 | inner side | Ni—Sn alloy formation | 1.9 | 0.35 | 500 | 360 | 1.58 | — | 0.61 | — |
|  | outer side | Ni plating | 2.2 | — | | | 2.13 | 0.90 | — | — |

TABLE 2

| Sample No. | | Plating layer | thickness of plating semi-bright Ni layer (μm) | thickness of plating bright Ni layer (μm) | thickness of plating Sn layer (μm) | condition of the heat treatment after plating heated temp. ° C. | condition of the heat treatment after plating heated time (min.) | thickness of the constructional layer Fe—Ni diffusion layer (μm) | thickness of the constructional layer Ni layer (μm) | thickness of the constructional layer Ni—Sn alloy layer (μm) | thickness of the constructional layer Fe—Ni—Sn alloy layer (μm) |
|---|---|---|---|---|---|---|---|---|---|---|---|
| EXAMPLE 2 | | | | | | | | | | | |
| 11 | inner side | Ni—Sn alloy formation | 0.9 | 1.2 | 0.09 | 500 | 360 | 1.85 | 0.42 | 0.15 | — |
|  | outer side | Ni plating | 2.2 | — | — | | | 1.72 | 0.38 | | — |
| 12 | inner side | Ni—Sn alloy formation | 1.0 | 1.1 | 0.35 | 500 | 360 | 1.84 | 0.43 | 0.60 | — |
|  | outer side | Ni plating | 2.2 | — | — | | | 1.73 | 0.39 | | — |
| 13 | inner side | Ni—Sn alloy formation | 0.5 | 1.5 | 0.70 | 500 | 360 | 1.78 | 0.40 | 1.08 | — |
|  | outer side | Ni plating | 2.3 | — | — | | | 1.72 | 0.38 | | — |
| 14 | inner side | Ni—Sn alloy formation | 1.0 | 1.9 | 2.6 | 400 | 300 | 0.00 | 2.90 | 2.94 | — |
|  | outer side | Ni plating | 2.3 | — | 0.72 | | | | | 1.28 | — |

TABLE 3

| Sample No. | Plating layer | | thickness of Ni plating (μm) | thickness of Ni—Sn plating (μm) | condition of the heat treatment after plating | | thickness of the constructional layer | | |
|---|---|---|---|---|---|---|---|---|---|
| | | | | | heated temp. °C. | heated time (min.) | Fe—Ni diffusion layer (μm) | Ni layer (μm) | Ni—Sn alloy layer (μm) |
| EXAMPLE 3 | | | | | | | | | |
| 15 | inner side | Ni—Sn alloy plating | 1.0 | 0.17 | 550 | 300 | — | — | 0.20 |
| | outer side | Ni plating | 2.5 | — | | | 2.3 | 1.4 | — |
| 16 | inner side | Ni—Sn alloy plating | 2.1 | 1.10 | 500 | 480 | 2.0 | 0.9 | 1.10 |
| | outer side | Ni plating | 2.0 | — | | | 2.3 | 0.8 | — |
| 17 | inner side | Ni—Sn alloy plating | 1.9 | 2.03 | 500 | 480 | 2.03 | 1.89 | 2.43 |
| | outer side | Ni plating | 3.2 | — | | | 2.5 | 1.8 | — |
| 18 | inner side | Ni—Sn alloy plating | 1.5 | 2.93 | 550 | 300 | — | — | 3.30 |
| | outer side | Ni plating | 2.3 | — | | | 2.4 | 0.8 | — |

TABLE 4

| Sample No. | Plating layer | | thickness of plating | | condition of the heat treatment after plating | | | thickness of the constructional layer | | | |
|---|---|---|---|---|---|---|---|---|---|---|---|
| | | | Ni (μm) | Sn (μm) | heat treat-ment | heated temp. °C. | heated time (min.) | Fe—Ni diffusion layer (μm) | Ni layer (μm) | Ni—Sn alloy layer (μm) | Fe—Ni—Sn alloy layer (μm) |
| COMPARATIVE EXAMPLE | | | | | | | | | | | |
| 19 | inner side | Ni plating | 1.1 | — | none | — | — | — | 1.1 | — | — |
| | outer side | Ni plating | 1.9 | — | | | | — | 1.9 | — | — |
| 20 | inner side | Ni plating | 1.9 | — | none | — | — | — | 1.9 | — | — |
| | outer side | Ni plating | 2.2 | — | | | | — | 2.2 | — | — |
| 21 | inner side | Ni plating | 1.0 | — | none | — | — | — | 1.0 | — | — |
| | outer side | Ni plating | 2.3 | — | | | | — | 2.3 | — | — |
| 22 | inner side | Ni plating and heat treatment | 1.0 | — | done | 500 | 360 | 1.7 | 0.3 | — | — |
| | outer side | Ni plating and heat treatment | 1.9 | — | | | | 2.1 | 0.9 | — | — |
| 23 | inner side | Ni plating and heat treatment | 2.0 | — | done | 600 | 480 | — | 4.8 | — | — |
| | outer side | Ni plating and heat treatment | 1.0 | — | | | | — | 4.7 | — | — |
| 24 | inner side | Ni plating and heat treatment | 1.2 | — | done | 500 | 360 | 1.6 | 1.0 | — | — |
| | outer side | Ni plating and heat treatment | 1.9 | — | | | | 2.3 | 0.2 | — | — |
| 25 | inner side | Ni—Sn alloy plating | 2.1 | 0.05 | done | 500 | 360 | 1.9 | — | 0.09 | — |
| | outer side | Ni plating | 2.2 | — Ni—Sn alloy plating | | | | 2.0 | 0.95 | — | — |
| 26 | inner side | Ni—Sn alloy plating | 2.0 | 1.05 | none | — | — | — | 2.0 | 1.05 | — |
| | outer side | Ni—Sn alloy plating | 1.9 | — | none | — | — | — | 1.9 | — | — |

TABLE 5

| | sample No. | graphite coating on the inner surface | internal resistence (mΩ) first stage | internal resistence (mΩ) after 30 days | battery performance short circuit current first stage (ampere) | battery performance short circuit current after 30 days (ampere) | total valuation |
|---|---|---|---|---|---|---|---|
| EXAMPLE | | | | | | | |
| 1 | 1 | none | 101 | 125 | 8.3 | 6.7 | good |
| | 2 | none | 98 | 115 | 8.0 | 7.2 | good |
| | 3 | none | 99 | 113 | 8.4 | 7.5 | good |
| | 4 | none | 100 | 117 | 8.2 | 7.6 | good |
| | 5 | none | 101 | 119 | 8.2 | 7.4 | good |
| | 6 | none | 97 | 120 | 8.1 | 7.3 | good |
| | 7 | none | 95 | 118 | 8.4 | 7.5 | good |
| | 8 | none | 96 | 105 | 8.6 | 7.6 | good |
| | 9 | existence | 83 | 106 | 11.5 | 9.5 | good |
| | 10 | existence | 79 | 105 | 11.8 | 9.8 | good |
| 2 | 11 | none | 85 | 110 | 10.7 | 9.0 | good |
| | 12 | existence | 72 | 101 | 12.3 | 10.3 | good |
| | 13 | none | 83 | 109 | 10.3 | 9.1 | good |
| | 14 | existence | 70 | 99 | 12.5 | 10.1 | good |
| 3 | 15 | none | 102 | 120 | 8.2 | 7.2 | good |
| | 16 | none | 98 | 115 | 8.7 | 7.1 | good |
| | 17 | existence | 79 | 98 | 11.8 | 9.5 | good |
| | 18 | none | 85 | 105 | 8.6 | 7.5 | good |
| COMPARA- | 19 | none | 125 | 143 | 5.6 | 4.0 | poor |
| TIVE | 20 | none | 122 | 139 | 5.7 | 4.4 | poor |
| EXM | 21 | existence | 109 | 119 | 9.3 | 7.8 | poor |
| | 22 | none | 128 | 139 | 5.5 | 4.2 | poor |
| | 23 | none | 125 | 142 | 5.6 | 4.3 | poor |
| | 24 | existence | 103 | 112 | 9.4 | 7.7 | poor |
| | 25 | none | 128 | 140 | 5.3 | 4.5 | poor |
| | 26 | none | 101 | 137 | 8.6 | 4.1 | poor |

What we claim is:

1. A method of manufacturing a surface treated steel sheet for battery containers having an exposed outermost nickel-tin alloy layer, comprising the steps of:
   plating nickel on both surfaces of a cold rolled steel sheet;
   plating tin on top of one surface of the nickel plated cold rolled steel sheet; and
   heat treating the nickel and tin plated cold rolled steel sheet to form a nickel-tin alloy layer as an exposed outermost layer.

2. A method of manufacturing a surface treated steel sheet according to claim 1, wherein said step of plating tin comprises plating tin on top of both surfaces of the nickel plated cold rolled steel sheet.

3. A method of manufacturing a surface treated steel sheet for battery containers, comprising the steps of:
   plating nickel on one surface of a cold rolled steel sheet to be later used as the outer surface of a battery container;
   after said nickel plating step, plating nickel-tin alloy on the other surface of the cold rolled steel sheet to be later used as the inner surface of the battery container; and
   heat treating the cold rolled steel sheet plated with nickel and nickel-tin alloy.

4. A method of manufacturing a surface treated steel sheet according to claim 3, wherein said step of plating nickel comprises plating nickel on both surfaces of the cold rolled steel sheet.

5. A method of manufacturing a surface treated steel sheet according to claim 4, wherein said step of plating nickel-tin alloy comprises plating nickel-tin alloy on top of both surfaces of the nickel plated cold rolled steel sheet.

6. A method of manufacturing a surface treated steel sheet for battery containers having an exposed outermost nickel-tin alloy layer, comprising the steps of:
   plating nickel-tin alloy on both sides of a cold rolled steel sheet; and
   heat treating the cold rolled steel sheet plated with the nickel-tin alloy as an exposed outermost layer.

* * * * *